(No Model.) 2 Sheets—Sheet 2.
O. E. MEYER.
APPARATUS FOR TREATING SEWAGE.
No. 505,166. Patented Sept. 19, 1893.
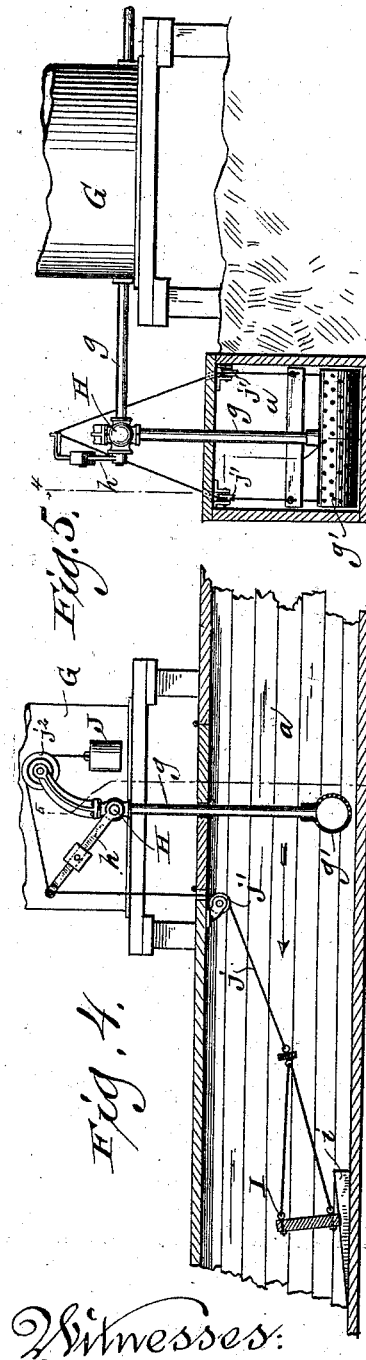
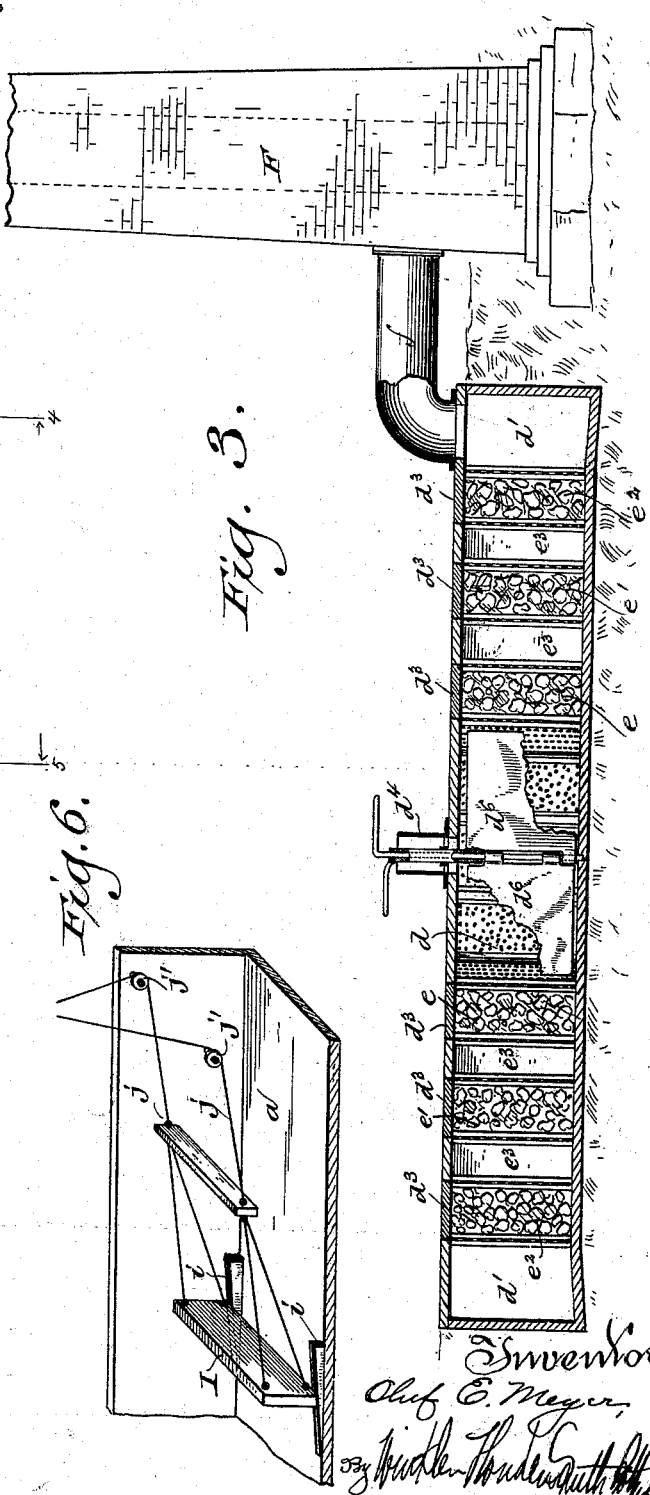

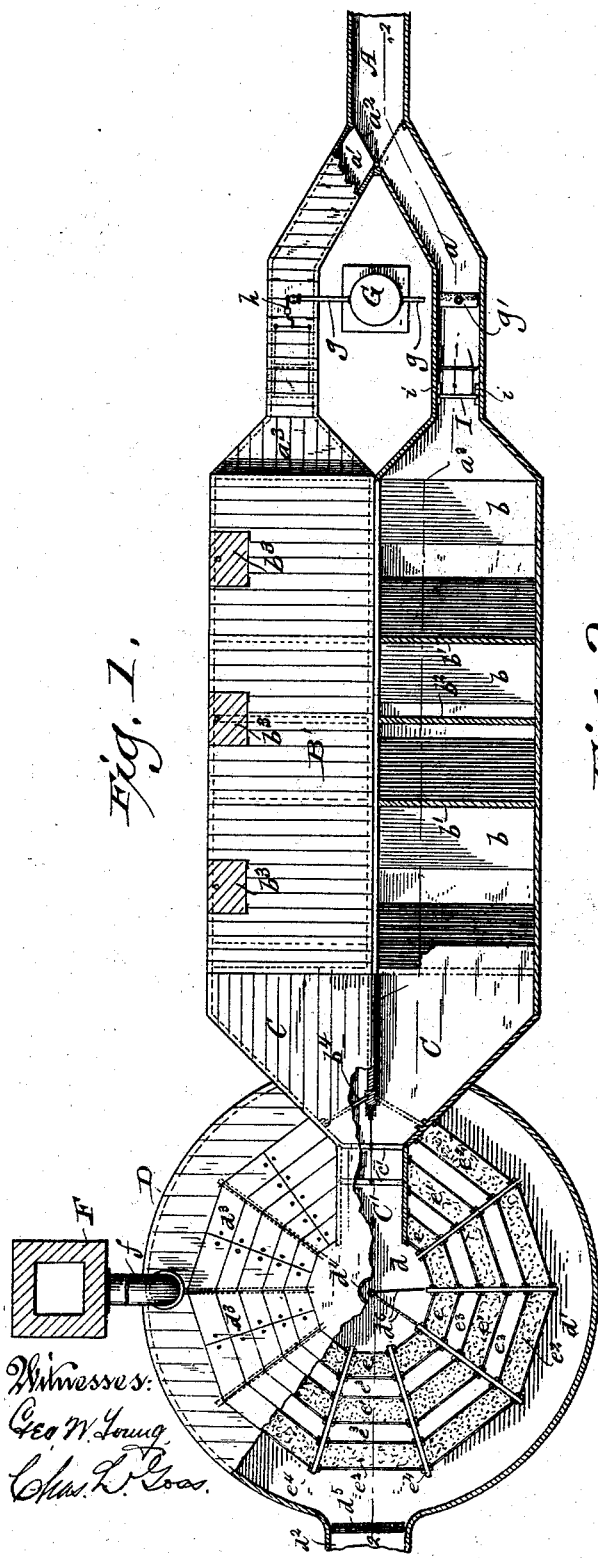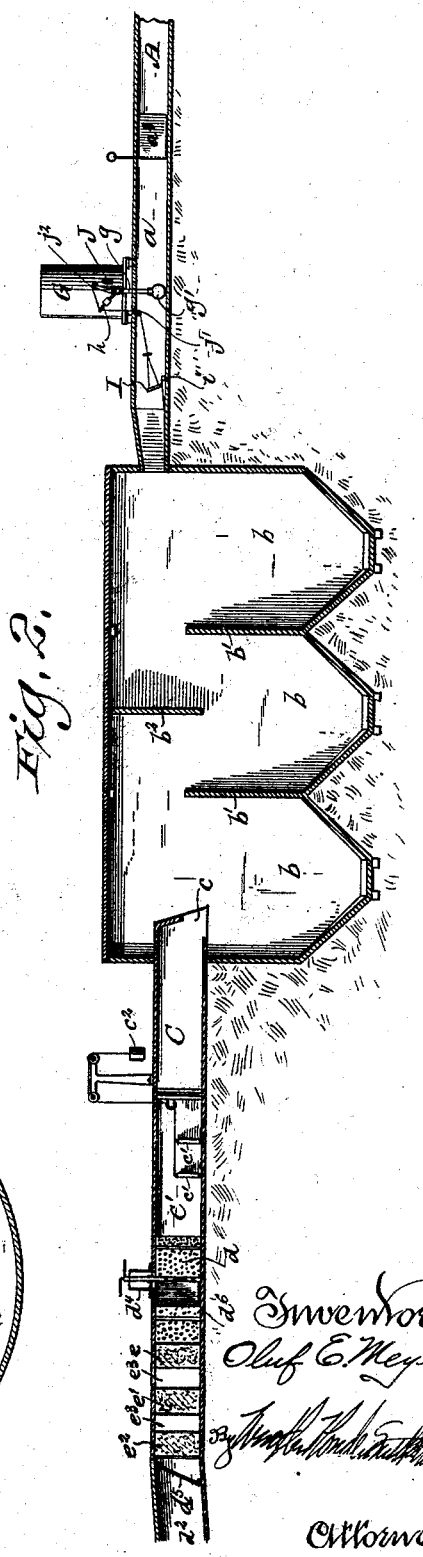

UNITED STATES PATENT OFFICE.

OLUF E. MEYER, OF MILWAUKEE, WISCONSIN.

APPARATUS FOR TREATING SEWAGE.

SPECIFICATION forming part of Letters Patent No. 505,166, dated September 19, 1893.

Application filed January 14, 1893. Serial No. 458,316. (No model.)

*To all whom it may concern:*

Be it known that I, OLUF E. MEYER, of Milwaukee, in the county of Milwaukee and State of Wisconsin, have invented certain new and useful Improvements in Apparatus for Treating Sewage; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to provide for the automatic introduction of chemicals into the sewage; to automatically regulate the flow of such chemicals according to the rate of flow of sewage; to afford an increasing area in cross section of filtering material as it becomes finer, and to thoroughly aerate the filters and sewage as it passes through them.

It consists essentially of a valve arranged to be controlled and regulated as to its opening by the flow of sewage through a conduit into which chemicals are introduced, of a circular or polygonal filter comprising a radiating series of filter cages, means for inducing a current of air through the filter cages, and of certain other novel features in the apparatus hereinafter particularly described and pointed out in the claims.

In the accompanying drawings like letters designate the same parts in the several figures.

Figure 1 is a plan view of apparatus embodying my improvements. Fig. 2 is a vertical longitudinal section of the same on the line 2 2, Fig. 1. Fig. 3 is a cross section on an enlarged scale of the filter in connection with the air draft chimney and connection, which are shown mainly in elevation. Figs. 4, 5 and 6 are detail views on an enlarged scale of the devices for regulating the flow of chemicals, Fig. 4 being a vertical longitudinal section on the line 4 4, Fig. 5; Fig. 5 a cross section on the line 5 5, Fig. 4, and Fig. 6 a sectional perspective view of one of the branch sewage conduits and of the device for regulating the opening of the chemical feed valve.

A is the induction conduit through which sewage is admitted to the apparatus. It is divided into two or more branches $a$ $a'$, which lead into a corresponding number of separate settling vats B B'. A gate $a^2$ is provided at the junction of the branches with the conduit A, whereby either branch may be closed and the sewage turned into the other. The discharging ends $a^3$ $a^3$ of the branches are expanded laterally as shown in Fig. 1, so as to spread the sewage and check its flow as it enters the settling vats. Each of these vats is preferably divided into three or more compartments $b$ $b$, by partitions $b'$ $b'$ extending from the bottom thereof upwardly to about the level at which it is designed to maintain the sewage therein.

Between and parallel with the partitions $b'$ $b'$ each vat is provided with a partition $b^2$ projecting at its lower edge below the upper edges of said partitions $b'$ and extending therefrom upwardly a sufficient distance to catch and retain greasy scum and light refuse floating on the surface of the sewage. These vats are provided with a close covering having openings and doors $b^3$ $b^3$ as shown in Fig. 1, to afford access to the vats for the purpose of removing the sludge therefrom, &c. The bottoms of the several compartments of the vats are preferably inclined or funnel-shaped, as shown in Fig. 2, so as to concentrate the sludge and thus facilitate its removal. At the ends opposite the induction connections, the vats communicate with eduction conduits C C, which converge and unite in a common conduit C', which leads into the filter D. Communication between the main eduction conduit C' and either branch C, may be closed by a gate $b^4$, as shown in Fig. 1. The openings $c$ $c$ from the vats into the eduction conduits C C are located below the level at which the liquid sewage is designed to be maintained so as to prevent any greasy scum or light refuse which may pass the partitions $b^2$, from entering the filter.

To automatically regulate the flow of sewage through the conduit C' and to maintain the sewage at a constant level in the vats, I provide cross gates or boards $c'$ $c'$, which are hinged at or near their lower edges in the conduit C' and are connected at or near their upper edges by a chain or cable passing over suitable sheaves, with a weight $c^2$. As the flow of sewage increases, the gates $c'$ $c'$ are turned against the action of weight $c^2$ so as to afford a larger opening and less obstruction to the flow. On the other hand, as the flow decreases, said gates will be moved by the weight $c^2$ against the force of the current to or toward an upright position, thus increasing the obstruction to the flow of sewage from the vat.

The filter D consists of a circular or polygonal box or inclosure having a central chamber $d$, into which the conduit $C'$ leads and opens, vertical imperforate partitions $e^4$ $e^4$ radiating therefrom, screens arranged between and transversely to said partitions and constituting therewith cages or receptacles $e$, $e'$ and $e^2$, which are separated from each other in a radial direction by clear spaces $e^3$ $e^3$, and a clear space or passage $d'$ surrounding the outer tier or row of filter cages and provided with an outlet opening or connection $d^2$.

The filter box or inclosure has a close covering provided with doors or movable sections $d^3$ through which ready access is had to either or any of the filter cages, and with an air inlet $d^4$, opening into the central chamber $d$.

In the discharge conduit $d^2$ I provide a loosely depending hinged gate $d^5$, which yields outwardly to the pressure of the outflowing sewage without opposing any material obstruction thereto, but closing the space above it so as to prevent the free ingress of air into the filter box. The bottom of the filter box is inclined downwardly outside of the filter cages, as shown in Fig. 3, thereby tending to drain the filters.

F is a chimney, preferably located in proximity with the filter and connected at or near its base by a pipe $f$, with the passage $d'$. By this means a strong current of air is drawn through the filter cages or receptacles from the central chamber $d$, into which it enters through the inlet $d^4$. The leaf $d^5$ in the outlet $d^2$ preventing the free admission of air directly into the passage $d'$, compels the draft produced by the chimney F to be supplied from the air which is freely admitted into chamber $d$ through the inlet $d^4$, and which must pass thence through the filter cages into the passage $d'$. In this way the liquid sewage passing through the filtering material as well as the filter material itself, is exposed to fresh air and thoroughly aerated and purified.

The inner filter cages $e$ $e$ are filled with the coarsest filtering material, the next outer row $e'$ $e'$, with finer material, and the outer row $e^2$ $e^2$ with the finest material. In this way a greater extent and amount of the finer grades of filtering material, which become sooner choked and through which liquid passes less readily, are afforded for a given flow of sewage in proportion to the coarser grades, through which the liquid passes more readily and which do not become easily clogged or choked.

Referring to Figs. 4, 5 and 6, in connection with Figs. 1 and 2, G represents a tank for holding chemicals in a liquid form, to be introduced into the sewage as it enters the apparatus, for the purpose of destroying organic matter contained therein and assisting in the separation of the solid from the liquid portions of the sewage. It is connected by pipes $g$ $g$ with chambers $g'$ $g'$ placed crosswise in and near the bottom of the branch conduits $a$ $a'$ and having perforations in one side presented against the current in said conduits.

H H are valves placed in the pipes $g$ $g$, and $h$ $h$ are adjustably weighted arms fixed to the projecting ends of the valve stems. The arm $h$ of each valve is connected by cords or chains $j$, passing over sheaves $j'$ $j'$ with a board or plate I loosely held in an upright position crosswise of the sewage conduit upon inclines $i$ $i$.

To a continuation of the chains or cords $j$, passing over a sheave $j^2$, is attached a counter weight J, acting in opposition to the current to which the plate I is subjected and tending through the arm $h$ to close the valve H. The greater the flow and the stronger the current of sewage in the conduit in which plate I is placed, the greater will be the force exerted to open the valve H, and hence the greater will be the amount of the chemical or chemicals admitted through the perforated chamber $g'$ into the sewage. As the flow of sewage decreases and the plate I recedes, it is elevated farther from the bottom of the conduit by the inclines $i$ $i$, thereby allowing a greater volume of liquid to pass under it. In this manner the closing of the valve is accelerated as the flow of sewage decreases. By moving the weights on the arms $h$ $h$ outwardly or inwardly thereon, the valves may be adjusted to open more or less readily as desired.

Various kinds of chemicals in solution or in a liquid form, such as are suitable and commonly used for the purpose of disinfecting or purifying sewage or destroying the organic matter contained therein, or promoting the separation and precipitation of solid matter, may be employed in my improved apparatus. Various kinds of filtering material may also be employed, but I suggest as suitable for the purpose, limestone for the coarser, iron manganese for the intermediate, and coarse asbestus for the finer grades, arranged in the cages $e$, $e'$ and $e^2$ in the order named.

For the purpose of rendering the operation of the apparatus continuous, two or more settling vats, such as B B' are provided, as well as a like number of branch induction conduits having connections with the tank for chemicals, and devices like or similar to those above described for regulating the flow of chemicals into either conduit. By this arrangement the sewage entering the apparatus from conduit A, may be shut out from either branch conduit, and the settling vat with which it communicates contracted through the other branch into the other settling vat, thus permitting the sludge to be removed from one vat, or repairs to be made, while the apparatus is in operation, communication between such vat and the common eduction conduit C' being temporarily closed by a gate $b^4$, as shown in Fig. 1.

In the central chamber $d$ of filter D, I provide two radiating gates $d^6$ $d^6$, which are supported by a central vertical shaft, and are each capable of being turned independently of the other and secured in line with either of the partitions $e^4$, so as to cut off any one or more of the radiating series of filter cages from said chamber $d$, for the purpose of renewing the filtering material, or making repairs. When not in use these gates may be brought together so as not to obstruct the flow of sewage to any of the filter cages.

Various changes may be made in the minor details of the apparatus without departure from the spirit of my invention.

I claim—

1. The combination in apparatus for the treatment of sewage, of a conduit through which the sewage flows, a tank or receptacle for holding chemicals to be introduced into the sewage, a connection with said tank or receptacle opening into said conduit and provided with a valve, and a plate exposed to the force of the current in said conduit and connected with said valve, substantially as and for the purposes set forth.

2. In apparatus for treating sewage the combination of a sewage conduit, a tank or receptacle for holding chemicals in a liquid state, a perforated chamber placed in said conduit and connected with said tank or receptacle, a valve placed in the connection between said tank and chamber, and a current-actuated device exposed to the sewage in said conduit and connected with said valve, substantially as and for the purposes set forth.

3. In apparatus for treating sewage, the combination of a sewage conduit, a tank for holding chemicals in a liquid condition, a distributer placed in said conduit and connected with said tank, a valve placed in the connection between said tank and distributer, and a plate exposed to the current in said conduit and connected with said valve, substantially as and for the purposes set forth.

4. In apparatus for treating sewage, the combination of a sewage conduit, a tank or receptacle for holding chemicals, a connection leading from said tank into said conduit and provided with a valve having an adjustably weighted arm, and a plate exposed to the current in said conduit and connected with said arm, substantially as and for the purposes set forth.

5. In apparatus for treating sewage, the combination of a sewage conduit, a tank for holding chemicals, a connection between said tank and conduit provided with a valve, a plate exposed to the current in said conduit and connected with said valve, and a counter weight acting in opposition to said plate on said valve, substantially as and for the purposes set forth.

6. In apparatus for treating sewage, the combination of a sewage conduit, a tank for holding chemicals, a connection between said tank and conduit provided with a valve which has an arm attached to its stem, a plate exposed to the current in said conduit and having a flexible connection with said arm, a counter weight also connected with said arm and acting thereon in opposition to said plate, and inclines upon which said plate rests, substantially as and for the purposes set forth.

7. In apparatus for treating sewage, a filter comprising a central chamber, a number of imperforate vertical partitions radiating therefrom and forming radiating conduits, screens arranged between and transversely to said partitions and forming therewith receptacles or cages for filtering material, an inlet connection with said central chamber and an outlet connection with the outer ends of said conduits, whereby the sewage is caused to flow in a radial direction from the center outward through said conduits, substantially as and for the purposes set forth.

8. In apparatus for treating sewage, a filter comprising a circular or polygonal box or inclosure provided with a central chamber, a number of partitions radiating therefrom, screens arranged transversely to and between said partitions and forming therewith receptacles for filtering material, a clear space or passage outside of said receptacles, and inlet and outlet connections with said central chamber and said outside space or passage, whereby the sewage is caused to flow in a radial direction outwardly through said receptacles, substantially as and for the purposes set forth.

9. In apparatus for treating sewage, the combination of a closed filter box or inclosure, having a central chamber provided with an air intake opening or connection, a number of partitions radiating therefrom, screens arranged between and transversely to said partitions and forming therewith receptacles for filtering material, and a clear space or passage outside of said receptacles and a chimney connected with said space or passage, substantially as and for the purposes set forth.

10. In apparatus for treating sewage, the combination of a box or inclosure containing cages or receptacles for filtering material, arranged radially around a central chamber into which the sewage is introduced, said chamber having an air inlet opening, a passage outside of said cages leading into an outlet conduit, a gate loosely suspended at its upper edge in said conduit, and a chimney connected with said passage, substantially as and for the purposes set forth.

11. In apparatus for treating sewage, a filter comprising a circular or polygonal box or inclosure having a central chamber with an inlet connection and radiating partitions forming a number of outwardly diverging radiating conduits, upright screens placed transversely between said partitions and forming in each conduit two or more receptacles for filtering material, with clear spaces between said receptacles, the outer receptacles in the several conduits being provided with the finer grades of filtering material, and an outlet passage with which the outer ends of said conduits communicate so as to cause the sewage to flow outwardly from the center in a radial direction through said conduits, substantially as and for the purposes set forth.

12. In apparatus for treating sewage, a filter comprising a circular or polygonal box or inclosure, a central chamber with an inlet connection and imperforate radiating partitions forming a number of radiating conduits, transverse screens interposed between said partitions and forming therewith receptacles for filtering material, an outlet passage communicating with the outer ends of said conduits so as to produce an outward flow of the sewage from the center through said conduits, and means of cutting off either conduit from the central chamber without obstructing the other conduits, substantially as and for the purposes set forth.

13. In apparatus for treating sewage, the combination of a filter box, filter cages arranged in series around an intermediate chamber into which the sewage is introduced, radiating partitions separating the filter cages from each other, and two gates hinged together at their inner ends to a central shaft in said chamber and capable of being turned at their outer ends into line with either of said partitions, substantially as and for the purposes set forth.

In testimony that I claim the foregoing as my own I affix my signature in presence of two witnesses.

OLUF E. MEYER.

Witnesses:
   CHAS. L. GOSS,
   LOUISA KUCKAHN.